(12) United States Patent
Hirata et al.

(10) Patent No.: US 8,851,651 B2
(45) Date of Patent: Oct. 7, 2014

(54) INK JET RECORDING METHOD AND RECORD

(75) Inventors: Shiki Hirata, Shiojiri (JP); Atsushi Denda, Chino (JP); Tsuyoshi Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 370 days.

(21) Appl. No.: 13/435,125

(22) Filed: Mar. 30, 2012

(65) Prior Publication Data

US 2012/0249667 A1 Oct. 4, 2012

(30) Foreign Application Priority Data

Mar. 30, 2011 (JP) .................. 2011-075820

(51) Int. Cl.
*C09D 11/00* (2014.01)
*C09D 11/322* (2014.01)
*C09D 11/40* (2014.01)
*B41J 2/21* (2006.01)

(52) U.S. Cl.
CPC ............. *B41J 2/2107* (2013.01); *C09D 11/322* (2013.01); *C09D 11/40* (2013.01)
USPC ........................................................ 347/100

(58) Field of Classification Search
USPC .......................................................... 347/100
See application file for complete search history.

(56) References Cited

U.S. PATENT DOCUMENTS

| | | | |
|---|---|---|---|
| 2007/0242098 A1* | 10/2007 | Sudo et al. ....................... | 347/40 |
| 2008/0145628 A1 | 6/2008 | Oyanagi et al. | |
| 2012/0147085 A1* | 6/2012 | Hirata et al. .................... | 347/20 |
| 2012/0242740 A1* | 9/2012 | Kondo et al. ................... | 347/20 |

FOREIGN PATENT DOCUMENTS

JP 2008174712 A 7/2008

* cited by examiner

*Primary Examiner* — Laura Martin
(74) *Attorney, Agent, or Firm* — Nutter McClennen & Fish LLP; John J. Penny, Jr.

(57) ABSTRACT

An ink jet recording method includes forming a first image by applying by an ink jet method a glitter ink in which a glitter pigment is dispersed to a first region of a recording medium in which the glitter first image is to be formed, and forming a second image by applying by an ink jet method a color ink containing a coloring material to a second region of the recording medium in which the colored second image is to be formed, the amount per unit area of the glitter ink ejected in an overlapping region in which the first region overlaps the second region being larger than the amount per unit area of the glitter ink ejected in the first region excluding the overlapping region.

20 Claims, 1 Drawing Sheet

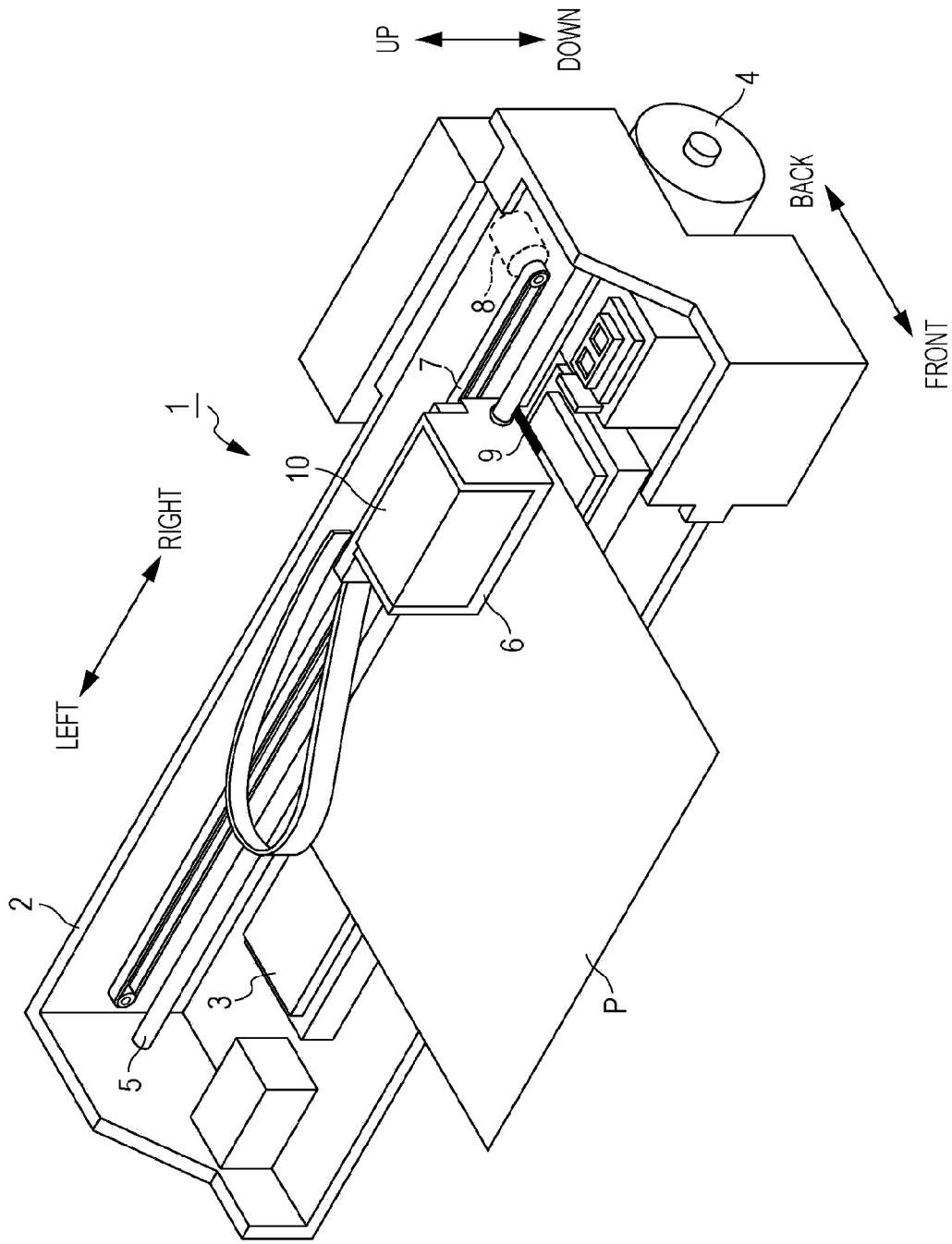

INK JET RECORDING METHOD AND RECORD

BACKGROUND

1. Technical Field

The present invention relates to a recording method using a glitter ink jet ink.

2. Related Art

In the field of printing called special color printing, there has recently been a marked increase in the amount of production of records in which a glitter image is formed on the recording surface. Methods such as pressing a metal-deposited foil against a recording medium to transfer an image (hot stamping) or applying a gold-silver ink which contains metals serving as coloring materials have been practically used in order to produce such glitter images.

Further, a method is known in which an ink containing a glitter pigment (hereinafter, referred to as "glitter ink") is ejected by an ink jet method to produce a record. An example of such a method is disclosed in JP-A-2008-174712. Recording methods using a glitter ink are advantageous in that glitter images can be readily formed as well as in that various kinds of images can be produced easily.

From JP-A-2008-174712, a glitter ink is known which contains a metal such as silver-aluminum serving as a coloring material. Images that are recorded using such a glitter ink (metallic images) exhibit metallic gloss with high shininess immediately after being printed. However, the images are discolored and the glitter (gloss) is decreased more quickly than images produced using general color inks (color images). Further, the decrease in glitter is more noticeable to human eyes than fading (discoloration) of usual color images.

The major cause of degradations such as gloss reduction and discoloration is lights such as UV rays present in the sunlight. In particular, there is a tendency for glitter gloss to easily deteriorate in a color glitter image print section in which a color ink has been printed over a glitter ink print section. This deterioration is caused by poor lightfastness due to some effect caused by the color ink.

A possible approach to prevent a decrease in gloss is for a glitter ink to contain additives that are effective in preventing the discoloration of glitter pigments, such as discoloration inhibitors (antirust agents) and UV absorbers. However, some of these additives are not desirable for use from the viewpoints of safety and environmental friendliness. Further, some additives can adversely affect properties of inks. Furthermore, the discoloration of metallic images cannot be prevented at times even by the addition of UV absorbers.

Although print sections that are recorded using a glitter ink exhibit glitter with very high shininess immediately after being printed, they are degraded, for example decreased in gloss and discolored, by lights such as UV rays present in the sunlight much more quickly than print sections produced with general color inks. Such degradations are correlated with the amount of glitter coloring material per unit area of the print section. The higher the content of a glitter coloring material, the smaller the degradations. Provided that images are produced using the same ink, the degradations tend to be suppressed with increasing amount of ink dots per unit area. Thus, in order to prevent the degradation in gloss and produce metallic images with excellent lightfastness, a glitter ink is often designed so as to contain additives that are effective in preventing the discoloration of glitter pigments, such as discoloration inhibitors and UV absorbers. However, it has been pointed out that some of these additives are hazardous in terms of safety and environmental friendliness. Further, some of the additives cause marked changes in properties of an ink in a short time, often resulting in an unsatisfactory ink composition.

SUMMARY

An advantage of some aspects of the invention is that metallic print sections having excellent lightfastness are provided.

Application Example 1

An ink jet recording method according to this application example includes forming a first image by applying by an ink jet method a glitter ink in which a glitter pigment is dispersed to a first region of a recording medium in which the glitter first image is to be formed, and forming a second image by applying by an ink jet method a color ink containing a coloring material to a second region of the recording medium in which the colored second image is to be formed, the amount per unit area of the glitter ink ejected in an overlapping region in which the first region overlaps the second region being larger than the amount per unit area of the glitter ink ejected in the first region excluding the overlapping region.

According to this application example, high lightfastness is ensured in the overlapping region formed by the glitter ink and the color ink. Further, this configuration when performed under specific conditions reduces the difference in the rate of decrease in glitter between the overlapping region and the first region excluding the overlapping region due to different lightfastness of these regions.

Application Example 2

In the ink jet recording method described in Application Example 1, the relationship $1.00 < Y/X \leq 3.00$ is satisfied wherein X is the amount [%] of glitter ink ejected in the first region excluding the overlapping region that is calculated as duty by using Equation (1) below, and Y is the amount [%] of glitter ink ejected in the overlapping region that is calculated as duty by using Equation (1) below:

$$\text{duty}(\%) = \text{number of actual recording dots}/(\text{vertical resolution} \times \text{horizontal resolution}) \times 100 \quad (1)$$

(wherein in Equation (1), "number of actual recording dots" refers to the number of actual recording dots per unit area, and "vertical resolution" and "horizontal resolution" each refer to the resolution per unit area).

According to this application example, the satisfaction of $1.00 < Y/X \leq 3.00$ ensures excellent lightfastness.

Application Example 3

In the ink jet recording method described in Application Example 1 or 2, the amount of the glitter ink ejected in the overlapping region is varied in accordance with the kind or the content of the coloring material contained in the color ink.

According to this application example, good lightfastness is ensured by controlling the amount of the glitter ink so as to be optimum in accordance with the kind or the content of the coloring material in the color ink.

Application Example 4

In the ink jet recording method described in any one of Application Examples 1 to 3, the duty calculated by using Equation (1) of the glitter ink in the first region excluding the overlapping region is 20% to 80%.

According to this application example, the amount of the ink ejected to the recording medium is controlled so as to be in an appropriate range, and thereby print sections having excellent glitter can be formed.

Application Example 5

In the ink jet recording method described in any one of Application Examples 1 to 4, the duty calculated by using Equation (1) of the glitter ink in the overlapping region is 30% to 100%.

According to this application example, the amount of the ink ejected to the recording medium is controlled so as to be in an appropriate range, and thereby print sections having excellent glitter can be formed.

Application Example 6

In the ink jet recording method described in any one of Application Examples 1 to 5, the amount of the color ink ejected per unit area in the overlapping region is more than 1 time the amount of the glitter ink ejected per unit area in the overlapping region.

According to this application example, the obtainable metallic color print sections display colors satisfactorily and exhibit excellent lightfastness.

Application Example 7

In the ink jet recording method described in any one of Application Examples 1 to 6, the glitter ink contains water at not less than 50% by mass.

Application Example 8

This application example is directed to a record recorded by the ink jet recording method described in any one of Application Examples 1 to 7.

BRIEF DESCRIPTION OF THE DRAWING

The invention will be described with reference to the accompanying drawing.

FIGURE is a perspective view that illustrates a schematic structure of an ink jet apparatus.

DESCRIPTION OF EXEMPLARY EMBODIMENTS

Preferred embodiments of the invention will be described in detail below.

Ink Jet Apparatuses

Prior to describing ink jet recording methods according to an aspect of the invention, there will be described preferred embodiments of ink jet apparatuses (liquid droplet ejecting apparatuses) used in the ink jet recording methods.

FIGURE is a perspective view that illustrates a schematic structure of an ink jet apparatus according to an embodiment of the invention.

As illustrated in FIGURE, an ink jet printer 1 (hereinafter, referred to as printer 1) that is a recording apparatus has a frame 2. The frame 2 has a platen 3, on which a recording medium P is transported by driving of a recording medium transporting motor 4. The frame 2 also has a rod-shaped guide member 5 that extends parallel to the longitudinal direction of the platen 3.

The guide member 5 supports a carriage 6 in such a manner that the carriage 6 can reciprocate in the axis direction of the guide member 5. The carriage 6 is connected to a carriage motor 8 via a timing belt 7 that is provided in the frame 2. The carriage 6 is configured to be reciprocatable along the guide member 5 by driving of the carriage motor 8.

The carriage 6 has a head 9. Further, an ink cartridge 10 for supplying a liquid ink to the head 9 is detachably provided in the carriage 6. Driving of a piezoelectric element (not shown) provided in the head 9 causes the ink in the ink cartridge 10 to be supplied from the ink cartridge 10 to the head 9 and to be ejected through a plurality of nozzles formed in a nozzle-forming surface of the head 9 toward the recording medium P that has been transported on the platen 3, thereby producing a record.

The ejection method may be a thermal jet (bubble jet (registered trademark)) method. Alternatively, any known methods may be used.

Ink Jet Recording Methods

Next, preferred embodiments of the ink jet recording methods according to an aspect of the invention will be described.

According to the ink jet recording method of the invention, an image is recorded on a recording medium by applying onto the recording medium a glitter ink in which a glitter pigment is dispersed, and a color ink which contains a coloring material.

The ink jet recording method according to an embodiment includes forming a first image by applying by an ink jet method a glitter ink to a first region of a recording medium in which the glitter first image is to be formed, and forming a second image by applying by an ink jet method a color ink containing a coloring material to a second region of the recording medium in which the colored second image is to be formed.

In the invention, the amount per unit area of the glitter ink ejected in an overlapping region in which the first region overlaps the second region is larger than the amount per unit area of the glitter ink ejected in the first region excluding the overlapping region (a region that is substantially formed by the glitter ink alone). Here, the first region is a region to which the glitter ink is to be applied. In the case where the glitter ink is applied to separate regions of a recording medium, each of such regions is the first region. The phrase "substantially formed by the glitter ink alone" means within publicly accepted limits and does not exclude cases in which the color ink is inevitably present or has been ejected onto the first region in such a small amount that no colors are visible. However, the phrase does exclude cases where the color ink is intentionally ejected to the first region in order to produce a color.

Images that are recorded using a glitter ink (for example, metallic images) exhibit glitter immediately after being printed. However, the images become discolored and the glitter (gloss) of the images decreases more quickly than images produced using general color inks. A possible remedy to prevent such a decrease in gloss is for a glitter ink to contain additives that are effective in preventing the discoloration of glitter pigments, such as discoloration inhibitors and UV absorbers. However, some of the discoloration inhibitors are not desirable for use from the viewpoints of safety and environmental friendliness. Further, some additives can cause marked changes in properties of inks in a short time. Furthermore, many of the additives do not produce desired effects.

The inventors of this invention have found that the degradations described above tend to be severer with decreasing amounts of a glitter pigment that is contained in a unit area of an image, and provided that images are produced using the same glitter ink, the degradations are reduced with decreasing amounts of ink dots per unit area.

Color glitter images having both gloss and color (color tone) (the term "color glitter" is sometimes referred to as "metallic color" for convenience, but this does not limit the glitter pigments to metal pigments) are produced by using a glitter ink and a color ink simultaneously. Although metallic color images can be formed by ejecting a glitter ink and a color ink at the same time, this method results in low gloss. Thus, a frequently used recording method is to form a glitter image with a glitter ink and to apply a color ink on the glitter image after a time interval. In this case, it has been found that the color ink layer that is printed over the glitter image affects the glitter pigment in such a way that the degradation of that print section is accelerated compared to when the glitter ink is used singly.

The inventors of this invention carried out studies on the basis of the above findings. As a result, they have found that images having excellent glitter and lightfastness can be recorded (produced) in such a manner that the amount per unit area of a glitter ink ejected in the overlapping region in which the first region and the second region overlap each other is larger than the amount per unit area of the glitter ink ejected in the first region excluding the overlapping region. The invention has been completed based on that finding.

Steps that are performed in the invention will be described below.

Step of Forming First Image

In this step (a step of forming a first image), a first image is formed in a first region on a recording medium by applying a glitter ink with use of an ink jet apparatus such as the one described above to the first region of the recording medium in which the glitter first image is to be formed.

In this step, the amount per unit area of the glitter ink ejected in an overlapping region in which the first region overlaps a second region described later in which a color image (a second image) is to be formed, is larger than the amount per unit area of the glitter ink ejected in the first region excluding the overlapping region. According to this configuration, it is possible to prevent a decrease in the glitter of the whole image including the portion of the image in the overlapping region, as well as to achieve excellent lightfastness for the whole image. Further, the above step when performed under specific recording conditions reduces the difference in the rate of deterioration of properties (in particular, decrease in glitter caused by different types of light such as UV rays present in the sunlight) between the overlapping region and the first region excluding the overlapping region with time.

In detail, it is preferable that the relationship $1.00<Y/X\leq 3.00$, more preferably the relationship $1.20\leq Y/X\leq 2.00$ be satisfied wherein X is the amount [%] of glitter ink ejected in the first region excluding the overlapping region that is calculated as duty by using Equation (1) below, and Y is the amount [%] of glitter ink ejected in the overlapping region that is calculated as duty by using Equation (1) below. In this manner, it is possible to prevent more effectively the decrease in glitter of the whole image including the portion of the image in the overlapping region, as well as to achieve particularly excellent lightfastness for the whole image.

$$\text{duty}(\%)=\text{number of actual recording dots}/(\text{vertical resolution}\times\text{horizontal resolution})\times 100 \qquad (1)$$

(In Equation (1), "number of actual recording dots" refers to the number of actual recording dots per unit area, and "vertical resolution" and "horizontal resolution" each refer to the resolution per unit area.)

It is preferable that the duty calculated by using Equation (1) of the glitter ink in the first region excluding the overlapping region be 20% to 80%, and more preferably 30% to 70%. In this manner, the image produced in the first region excluding the overlapping region achieves higher glitter and lightfastness.

It is preferable that the duty calculated by using Equation (1) of the glitter ink in the overlapping region be 30% to 100%, and more preferably 35% to 80%. In this manner, the image produced in the overlapping region achieves higher glitter and lightfastness.

Because the influence of coloring materials on the glitter ink is variable in accordance with the types of coloring materials, the ink jet recording method may be configured such that the amount per unit area of glitter ink ejected in the overlapping region is varied in accordance with the kind or the content of a coloring material contained in a color ink described later. In an exemplary case where the overlapping region has a region to which a magenta ink will be primarily ejected and a region to which a yellow ink will be primarily ejected, the glitter ink may be ejected to these regions in differing amounts per unit area. In this manner, images having excellent glitter and lightfastness as well as high color properties can be recorded (produced).

Recording Media

The recording media are not particularly limited. Examples thereof include various kinds of paper, cloth, plastics, films and sheets.

Glitter Inks

The glitter ink contains a glitter pigment. Any glitter pigments may be used as long as the glitter ink containing the pigment can be ejected as droplets by the ink jet recording method. The glitter pigment provides a glitter effect when the glitter ink is attached to a resin ink layer, and adds glitter to an object that is attached to the glitter layer. Examples of the glitter pigments include pearl pigments and metal particles. Typical examples of the pearl pigments include pearlescent pigments and interference pigments such as titanium dioxide-coated mica, argentine and bismuth oxychloride. Examples of the metal particles include particles of metals such as aluminum, silver, gold, platinum, nickel, chromium, tin, zinc, indium, titanium and copper. The metal particles may be particles of at least one of these metals, alloys thereof and mixtures of these metals and alloys.

From the viewpoint of high gloss (glitter), the glitter pigment used in this embodiment is preferably silver particles. Hereinbelow, a silver ink will be described as a specific example of the glitter ink.

1. Silver Particles

As described above, the silver ink in this embodiment contains silver particles. The silver ink containing silver particles can form images exhibiting excellent metallic gloss. Because silver has a high whiteness among metals, the silver ink can produce various metallic colors such as gold and bronze by covering or by being covered by an ink of different color.

The average particle diameter of the silver particles is preferably 3 nm to 100 nm, and more preferably 20 nm to 65 nm. This average particle diameter ensures that the silver ink produces images having particularly excellent gloss (glitter) and friction resistance. The average particle diameter in the above range also ensures that the ink exhibits particularly excellent ejection stability (for example, landing accuracy and stability of ejection amount) in an ink jet system. Thus, images of desired quality can be produced more reliably over the long term. In this specification, the term "average particle diameter" refers to a volume average particle diameter unless otherwise mentioned. The average particle diameter may be measured with a particle size distribution analyzer using a laser diffraction scattering method. An exemplary laser diffraction particle size distribution analyzer is a particle size distribution analyzer using a dynamic light scattering method (for example, MICROTRACK UPA manufactured by NIKKISO CO., LTD.).

The content of the silver particles in the silver ink is preferably 0.5% to 30% by mass, and more preferably 5.0% to 15% by mass. This content ensures that the ink achieves particularly excellent ejection stability in an ink jet system as well as particularly excellent storage stability. Further, the silver ink having the above content of the silver particles can give a record which has good image quality and high friction resistance over a wide range of values of density (the content per unit area) of silver particles on the recording medium.

The silver particles may be prepared by any methods. In a preferred method, a solution containing silver ions may be provided and the silver ions may be reduced.

2. Resins

The glitter ink according to the invention may contain a resin. The use of a resin improves fixation and friction resistance for the image. Examples of the resins include but are not limited to polyacrylic acids, polymethacrylic acids, polymethacrylates, polyethylacrylic acids, styrene/butadiene copolymers, polybutadienes, acrylonitrile/butadiene copolymers, chloroprene copolymers, fluororesins, vinylidene fluorides, polyolefin resins, celluloses, styrene/acrylic acid copolymers, styrene/methacrylic acid copolymers, polystyrenes, styrene/acrylamide copolymers, polyisobutyl acrylates, polyacrylonitriles, polyvinyl acetates, polyvinylacetals, polyamides, rosin resins, polyethylenes, polycarbonates, vinylidene chloride resins, cellulose resins such as cellulose acetate butyrate, vinyl acetate resins, ethylene/vinyl acetate copolymers, vinyl acetate/acrylic copolymers, vinyl chloride resins, polyurethanes and rosin esters.

3. Water

The glitter ink according to the invention may be an aqueous ink containing water at not less than 50% by mass, or may be a non-aqueous ink containing water at less than 50% by mass.

When the glitter ink is an aqueous ink containing water at not less than 50% by mass, the dispersibility of the silver particles is improved and the silver particles can be effectively arranged or arrayed on the surface of the produced image. As a result, images having excellent glitter and lightfastness can be recorded (produced) more effectively.

When the ink contains water, the water mainly functions as a dispersion medium for dispersing the silver particles and wax particles. The water contained in the ink allows the particles such as the silver particles to be dispersed stably. Further, the water allows for quick drying of the ink applied on the recording medium while preventing undesired drying (the evaporation of the dispersion medium) of the ink in the vicinity of the nozzles of a liquid droplet ejecting apparatus that will be described later. Consequently, desired images can be recorded at high speed favorably over the long term. When the ink contains water, the content of water is not particularly limited, but is preferably 20% to 80% by mass, and more preferably 25% to 70% by mass.

4. Polyhydric Alcohols

The glitter ink according to the invention preferably contains a polyhydric alcohol. The polyhydric alcohol suppresses the drying of the ink when the ink in this embodiment is used in an ink jet recording apparatus, and prevents the clogging of the ink jet recording head by the ink.

Examples of the polyhydric alcohols include ethylene glycol, diethylene glycol, triethylene glycol, polyethylene glycol, polypropylene glycol, propylene glycol, butylene glycol, 1,2,6-hexanetriol, thioglycol, hexylene glycol, glycerol, trimethylolethane, trimethylolpropane, 1,2-butanediol, 1,2-pentanediol, 1,2-hexanediol, 1,2-heptanediol, 1,2-octanediol, 1,3-propanediol, 1,4-butanediol, 1,5-pentanediol and 1,6-hexanediol. In particular, alkane diols having 4 to 8 carbon atoms are preferable, and alkane diols having 6 to 8 carbon atoms are more preferable. The use of such a polyhydric alcohol results in particularly high penetration properties into the recording medium. The content of the polyhydric alcohol in the ink is not particularly limited, but is preferably 0.1% to 20% by mass, and more preferably 0.5% to 10% by mass.

Of the above polyhydric alcohols, the ink preferably contains 1,2-hexanediol and trimethylolpropane. When the ink contains such polyhydric alcohols, the silver particles achieve particularly excellent dispersion stability and the ink shows particularly excellent storage stability as well as particularly excellent ejection stability.

5. Glycol Ethers

The glitter ink according to the invention preferably contains a glycol ether. The ink containing a glycol ether shows higher wetting properties with respect to the recording surface of the recording medium, and thereby achieves higher penetration properties.

Examples of the glycol ethers include lower alkyl ethers of polyhydric alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether and tripropylene glycol monomethyl ether. Of these, the use of triethylene glycol monobutyl ether results in good image quality. The content of the glycol ether in the ink is not particularly limited, but is preferably 0.2% to 20% by mass, and more preferably 0.3% to 10% by mass.

6. Surfactants

The glitter ink according to the invention preferably contains an acetylene glycol surfactant or a polysiloxane surfactant. The acetylene glycol surfactant or the polysiloxane surfactant increases wettability with respect to the recording surface of the recording medium, and thereby enables the ink to have higher penetration properties.

Examples of the acetylene glycol surfactants include 2,4,7,9-tetramethyl-5-decyne-4,7-diol, 3,6-dimethyl-4-octyne-3,6-diol, 3,5-dimethyl-1-hexyn-3-ol and 2,4-dimethyl-5-hexyn-3-ol. Commercial acetylene glycol surfactants may be used, with examples including Olfine E1010 STG and Y (manufactured by Nissin Chemical Co., Ltd.) and SURFYNOL 104, 82, 465, 485 and TG (manufactured by Air Products and Chemicals Inc.).

Commercial polysiloxane surfactants may be used, with examples including BYK-347 and BYK-348 (manufactured by BYK Japan K.K.).

The ink according to the invention may contain other surfactants such as anionic surfactants, nonionic surfactants and amphoteric surfactants.

The content of the surfactant in the glitter ink is not particularly limited, but is preferably 0.01% to 5.0% by mass, and more preferably 0.1% to 1.5% by mass.

7. Other Components

The glitter ink according to the invention may contain components (other components) other than those described above. Examples of such components include pH adjusters, penetrating agents, organic binders, drying inhibitors such as urea compounds and alkanolamines (such as triethanolamine), and thiourea.

Step of Forming Second Image

In this step (a step of forming a second image), a second image is formed by applying by an ink jet method a color ink to a second region on the recording medium in which the colored second image is to be formed, thereby producing a record according to the invention.

The amount of the color ink ejected in the second region is not particularly limited. However, it is preferable that the duty calculated by using Equation (1) of the color ink in the overlapping region in which the second region overlaps the first region be 10% to 100%, and more preferably 20% to 80%. In this manner, metallic color images having excellent color properties can be formed.

By increasing the amount of the color ink ejected per unit area in the overlapping region, the lightfastness of the glitter ink is improved. Thus, it is preferable that the amount of the color ink ejected per unit area (in the case where a plurality of colors are used, the total amount of the color inks per unit area) in the overlapping region be more than 1 time, more preferably not less than 1.2 times, and still more preferably not less than 1.5 times the amount of the glitter ink ejected per unit area in the overlapping region. According to this configuration, the obtainable images achieve still improved lightfastness. Further, this configuration when performed under specific conditions reduces the difference in the rate of decrease in glitter caused by lights such as the sunlight between the overlapping region and the first region excluding the overlapping region.

Color Inks

The color ink contains a coloring material. Examples of the color inks include cyan ink, magenta ink, yellow ink, light cyan ink, light magenta ink, dark yellow ink, red ink, green ink, blue ink, orange ink, violet ink, black ink and light black ink.

Examples of the coloring materials include pigments and dyes. Any coloring materials used in usual inks may be used without limitation.

The pigments used in this embodiment are not particularly limited, and various known pigments may be used.

Examples of organic yellow pigments include C. I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172 and 180.

Examples of organic magenta pigments include C. I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224 and 245, and C. I. pigment violet 19, 23, 32, 33, 36, 38, 43 and 50.

Examples of organic cyan pigments include C. I. pigment blue 1, 2, 3, 15, 15:1, 15:2, 15:3, 15:4, 15:6, 15:34, 16, 18, 22, 25, 60, 65 and 66, and C. I. vat blue 4 and 60.

Examples of organic pigments other than the magenta, cyan and yellow pigments include C. I. pigment green 7 and 10, C. I. pigment brown 3, 5, 25 and 26, and C. I. pigment orange 2, 5, 7, 13, 14, 15, 16, 24, 34, 36, 38, 40, 43 and 63.

The pigment preferably has an average particle diameter of about 10 nm to 200 nm, and more preferably about 50 nm to 150 nm. The addition amount of the pigment in this embodiment is preferably about 1% to 25% by mass, and more preferably about 3% to 20% by mass.

Examples of the dyes which can be used in this embodiment include acridine dyes, aniline dyes, anthraquinone dyes, azine dyes, azomethine dyes, benzoquinone dyes, naphthoquinone dyes, indigoid dyes, indophenol dyes, indoaniline dyes, indamine dyes, leuco dyes, naphthalimide dyes, nigrosine dyes, induline dyes, nitro dyes, nitroso dyes, oxazine dyes, dioxazine dyes, oxidation dyes, phthalocyanine dyes, polymethine dyes, quinophthalone dyes, sulfide dyes, triacrylmethane dyes, diacrylmethane dyes, thiazine dyes, thiazole dyes, xanthene dyes and cyanine dyes.

Specific examples of yellow dyes include C. I. acid yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164 and 165, C. I. direct yellow 1, 8, 11, 12, 24, 26, 27, 33, 39, 44, 50, 58, 85, 86, 87, 88, 89, 98, 110, 132, 142 and 144, C. I. reactive yellow 1, 2, 3, 4, 6, 7, 11, 12, 13, 14, 15, 16, 17, 18, 22, 23, 24, 25, 26, 27, 37 and 42, C. I. food yellow 3 and 4, and C. I. solvent yellow 15, 19, 21, 30 and 109.

Specific examples of magenta dyes include C. I. acid red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321 and 322, C. I. direct red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231, C. I. reactive red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63 and 64, C. I. solubilized red 1, and C. I. food red 7, 9 and 14.

Specific examples of cyan dyes include C. I. acid blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236 and 249, C. I. direct blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248 and 249, C. I. reactive blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46, C. I. solubilized vat blue 1, 5 and 41, C. I. vat blue 4, 29 and 60, C. I. food blue 1 and 2, and C. I. basic blue 9, 25, 28, 29 and 44.

Examples of the dyes of other colors include C. I. acid green 7, 12, 25, 27, 35, 36, 40, 43, 44, 65 and 79, C. I. direct green 1, 6, 8, 26, 28, 30, 31, 37, 59, 63 and 64, C. I. reactive green 6 and 7, C. I. acid violet 15, 43, 66, 78 and 106, C. I. direct violet 2, 48, 63 and 90, and C. I. reactive violet 1, 5, 9 and 10.

One or more dyes may be selected from any group of the dyes of the same color as well as from the groups of the dyes of differing colors.

The addition amount of the dye in this embodiment is preferably about 1% to 25% by mass, and more preferably about 3% to 20% by mass.

The color ink preferably contains a resin component. When the color ink contains a resin component, the second image increases adhesion with respect to the recording medium.

Examples of the resin components include but are not limited to polyacrylic acids, polymethacrylic acids, polymethacrylates, polyethylacrylic acids, styrene/butadiene copolymers, polybutadienes, acrylonitrile/butadiene copolymers, chloroprene copolymers, fluororesins, vinylidene fluorides, polyolefin resins, celluloses, styrene/acrylic acid copolymers, styrene/methacrylic acid copolymers, polystyrenes, styrene/acrylamide copolymers, polyisobutyl acrylates, polyacrylonitriles, polyvinyl acetates, polyvinylacetals, polyamides, rosin resins, polyethylenes, polycarbonates, vinylidene chloride resins, cellulose resins such as cellulose acetate butyrate, vinyl acetate resins, ethylene/vinyl acetate copolymers, vinyl acetate/acrylic copolymers, vinyl chloride resins, polyurethanes and rosin esters.

The content of the resin component in the color ink is preferably 0.1% to 10% by mass, and more preferably 0.5% to 5% by mass. This content ensures that a second image having excellent coloring properties can be produced more effectively. When the color ink contains the resin component, the lightfastness of the ink is further improved.

Examples according to the invention will be described below.

1. Preparation of Glitter Ink

Polyvinylpyrrolidone (PVP, weight average molecular weight 10000) was heated at 70° C. for 15 hours and was thereafter cooled at room temperature. This PVP weighing 1000 g was added to 500 ml of an ethylene glycol solution to give a PVP solution. Separately, 500 ml of ethylene glycol was added to a container, and 128 g of silver nitrate was added thereto. The mixture was sufficiently stirred with an electromagnetic stirrer to give a silver nitrate solution. While the PVP solution was stirred at 120° C. using an overhead mixer, the silver nitrate solution was added. The mixture was heated for about 80 minutes to perform the reaction. Thereafter, the reaction solution was cooled at room temperature and was centrifuged at 2200 rpm for 10 minutes. The separated silver particles were collected and added to 500 ml of an ethanol solution to remove the unnecessary PVP. The mixture was further centrifuged and the silver particles were collected. The silver particles were then dried in a vacuum drier at 35° C. and 1.3 Pa.

A glitter ink was prepared by mixing 10% by mass of the silver particles produced above, 3% by mass of 1,2-hexanediol, 0.3% by mass of triethanolamine, 15% by mass of trimethylolpropane, 1% by mass of a nonionic surfactant (Olfine® E1010 manufactured by Nissin Chemical Co., Ltd.), and an amount of ion exchange water for adjusting the concentration.

2. Color Inks

The following color inks were used.
Magenta ink (ICM37 manufactured by SEIKO EPSON CORPORATION)
Yellow ink (ICY37 manufactured by SEIKO EPSON CORPORATION)

3. Preparation of Clear Ink

A clear ink was prepared by mixing 3% by mass of 1,2-hexanediol, 15% by mass of trimethylolpropane, 10% by mass of a resin (JONCRYL® 62 manufactured by BASF), 1% by mass of a nonionic surfactant (Olfine® E1010 manufactured by Nissin Chemical Co., Ltd.), 0.3% by mass of a pH adjuster (triethanolamine), and a balance of ion exchange water.

4. Production of Records

Examples 1 to 10, Comparative Examples 1 and 2, and Reference Examples 1 to 4

The glitter ink and the color inks were loaded into cartridges that were exclusive for ink jet printer PX-G930 manufactured by SEIKO EPSON CORPORATION.

Next, commercial gloss paper (glossy photo paper manufactured by SEIKO EPSON CORPORATION) was set in the printer.

A first image was formed in a first region on the glossy paper with the glitter ink.

Subsequently, a second image was formed in a second region on the glossy paper with the color ink.

TABLE 1

| | Color ink | Duty (X) [%] of glitter ink in first region excluding overlapping region | Duty (Y) [%] of glitter ink in overlapping region | Duty [%] of color ink | Y/X |
|---|---|---|---|---|---|
| Ex. 1 | Magenta | 50 | 70 | 50 | 1.40 |
| Ex. 2 | Magenta | 50 | 70 | 90 | 1.40 |
| Ex. 3 | Magenta | 30 | 70 | 90 | 2.33 |
| Ex. 4 | Magenta | 20 | 50 | 50 | 2.50 |
| Ex. 5 | Magenta | 20 | 60 | 50 | 3.00 |
| Ex. 6 | Magenta | 30 | 50 | 50 | 1.67 |
| Ex. 7 | Magenta | 30 | 50 | 90 | 1.67 |
| Ex. 8 | Magenta | 20 | 30 | 50 | 1.50 |
| Ex. 9 | Magenta | 20 | 30 | 90 | 1.50 |
| Ex. 10 | Yellow | 30 | 50 | 50 | 1.67 |
| Ex. 11 | Yellow | 30 | 50 | 90 | 1.67 |
| Comp. Ex. 1 | Magenta | 50 | 50 | 50 | 1.00 |
| Comp. Ex. 2 | Magenta | 30 | 30 | 50 | 1.00 |
| Ref. Ex. 1 | — | 100 | — | — | — |

TABLE 2

| | Color ink | Duty [%] of glitter ink in first region excluding overlapping region | Duty [%] of color ink | Gloss |
|---|---|---|---|---|
| Ref. Ex. 2 | Magenta | 40 | 50 | 150 |
| Ref. Ex. 3 | Magenta | 50 | 50 | 160 |
| Ref. Ex. 4 | Magenta | 60 | 50 | 149 |

5. Evaluation of Lightfastness

A lightfastness test was carried out by a JEITA CP-3901 method using a xenon lightfastness tester. After exposure equivalent to one month, the gloss was measured using MULTI GLOSS 268 GLOSS METER (product name, manufactured by KONICA MINOLTA HOLDINGS, INC.). The rates of decrease in gloss (glitter) of the overlapping region and the first region excluding the overlapping region were measured. The difference in the rate of decrease in gloss between these regions was evaluated based on the following criteria.

A: The difference was less than 10%.
B: The difference was 10% to less than 30%.
C: The difference was 30% to less than 40%.
D: The difference was 40% or more.

6. Evaluation of Gloss at 60°

The records were tested to evaluate the gloss at a tilt angle of 60° with respect to the overlapping region and the first region excluding the overlapping region using a gloss meter (MINOLTA MULTI GLOSS 268).

The results are described in Tables 1 to 3.

TABLE 3

| | Evaluation of lightfastness | | | |
| --- | --- | --- | --- | --- |
| | First region excluding overlapping region Rate of decrease (%) | Overlapping region | | |
| | | Rate of decrease (%) | Difference in rate of decrease | Evaluation |
| Ex. 1 | 16.2 | 35.3 | 19.1 | B |
| Ex. 2 | 16.2 | 15.6 | 0.6 | A |
| Ex. 3 | 26.3 | 15.6 | 10.7 | B |
| Ex. 4 | 40.7 | 52.1 | 11.4 | B |
| Ex. 5 | 40.7 | 57.3 | 16.6 | B |
| Ex. 6 | 26.3 | 52.1 | 25.8 | C |
| Ex. 7 | 26.3 | 24.3 | 2 | A |
| Ex. 8 | 40.7 | 67.3 | 26.6 | C |
| Ex. 9 | 40.7 | 45.6 | 4.9 | A |
| Ex. 10 | 16.2 | 17.7 | 1.5 | A |
| Ex. 11 | 16.2 | 5.8 | 10.4 | B |
| Comp. Ex. 1 | 16.2 | 52.1 | 35.9 | D |
| Comp. Ex. 2 | 26.3 | 67.3 | 41 | D |
| Ref. Ex. 1 | 11.3 | — | — | — |

As shown in Table 3, the images recorded (produced) by the ink jet recording method according to the invention achieved excellent glitter and lightfastness. In contract, the results obtained in Comparative Examples were not satisfactory.

What is claimed is:

1. An ink jet recording method comprising:
    forming a first image by applying by an ink jet method a glitter ink in which a glitter pigment is dispersed to a first region of a recording medium in which the glitter first image is to be formed, and
    forming a second image by applying by an ink jet method a color ink containing a coloring material to a second region of the recording medium in which the colored second image is to be formed,
    the amount per unit area of the glitter ink ejected in an overlapping region in which the first region overlaps the second region being larger than the amount per unit area of the glitter ink ejected in the first region excluding the overlapping region.

2. The ink jet recording method according to claim 1, wherein the relationship $1.00<Y/X\leq3.00$ is satisfied wherein X is the amount [%] of glitter ink ejected in the first region excluding the overlapping region that is calculated as duty by using Equation (1) below, and Y is the amount [%] of glitter ink ejected in the overlapping region that is calculated as duty by using Equation (1) below:

$$\text{duty}(\%) = \text{number of actual recording dots}/(\text{vertical resolution} \times \text{horizontal resolution}) \times 100 \quad (1)$$

(wherein in Equation (1), "number of actual recording dots" refers to the number of actual recording dots per unit area, and "vertical resolution" and "horizontal resolution" each refer to the resolution per unit area).

3. The ink jet recording method according to claim 1, wherein the amount of the glitter ink ejected in the overlapping region is varied in accordance with the kind or the content of the coloring material contained in the color ink.

4. The ink jet recording method according to claim 1, wherein the duty calculated by using Equation (1) of the glitter ink in the first region excluding the overlapping region is 20% to 80%.

5. The ink jet recording method according to claim 1, wherein the duty calculated by using Equation (1) of the glitter ink in the overlapping region is 30% to 100%.

6. The ink jet recording method according to claim 1, wherein the amount of the color ink ejected per unit area in the overlapping region is more than 1 time the amount of the glitter ink ejected per unit area in the overlapping region.

7. The ink jet recording method according to claim 1, wherein the glitter ink contains water at not less than 50% by mass.

8. A record recorded by the ink jet recording method described in claim 1.

9. A record recorded by the ink jet recording method described in claim 2.

10. A record recorded by the ink jet recording method described in claim 3.

11. A record recorded by the ink jet recording method described in claim 4.

12. A record recorded by the ink jet recording method described in claim 5.

13. A record recorded by the ink jet recording method described in claim 6.

14. A record recorded by the ink jet recording method described in claim 7.

15. A recording apparatus which performs the ink jet recording method described in claim 1.

16. A recording apparatus which performs the ink jet recording method described in claim 2.

17. A recording apparatus which performs the ink jet recording method described in claim 3.

18. A recording apparatus which performs the ink jet recording method described in claim 4.

19. A recording apparatus which performs the ink jet recording method described in claim 5.

20. A recording apparatus which performs the ink jet recording method described in claim 6.

* * * * *